United States Patent [19]

Iida

[11] Patent Number: 5,689,482
[45] Date of Patent: Nov. 18, 1997

[54] DISC DRIVE DEVICE OPERABLE WITH DIFFERENT DISCS THAT MAY EXHIBIT DIFFERENT LINEAR VELOCITIES OR CIRCUMFERENTIAL RECORDING DENSITIES

[75] Inventor: Michihiko Iida, Kanagawa, Japan

[73] Assignee: Sony Corporation, Tokyo, Japan

[21] Appl. No.: 534,658

[22] Filed: Sep. 27, 1995

[30] Foreign Application Priority Data

Sep. 28, 1994 [JP] Japan .................................. 6-233097

[51] Int. Cl.$^6$ .................................................. G11B 17/22
[52] U.S. Cl. .................................. 369/32; 369/44.28
[58] Field of Search ........................... 369/44.28, 44.29, 369/44.34, 32, 50, 78.04, 78.05, 78.06, 70.14

[56] References Cited

U.S. PATENT DOCUMENTS 5,136,560  8/1992  Hangai et al. .................. 369/44.28
5,216,647  6/1993  Kitani .............................. 369/44.28
5,247,498  9/1993  Takekoshi et al. ................. 369/32
5,444,682  8/1995  Yamada et al. ................. 369/44.29

*Primary Examiner*—Thang V. Tran
*Attorney, Agent, or Firm*—William S. Frommer; Alvin Sinderbrand

[57] ABSTRACT

An optical disc drive device performs a seek operation during a recording and/or reproducing mode on different discs, such as CDs or MDs, individually loaded thereon, which may differ from one another in linear velocity or circumferential recording density. The linear velocity of a disc is calculated as a function of the number of rotations of a disc spin motor and position information of the pickup head. The number of tracks from a current position of the pickup to a target position is determined by using the address of the target position and the linear velocity of the disc.

15 Claims, 6 Drawing Sheets

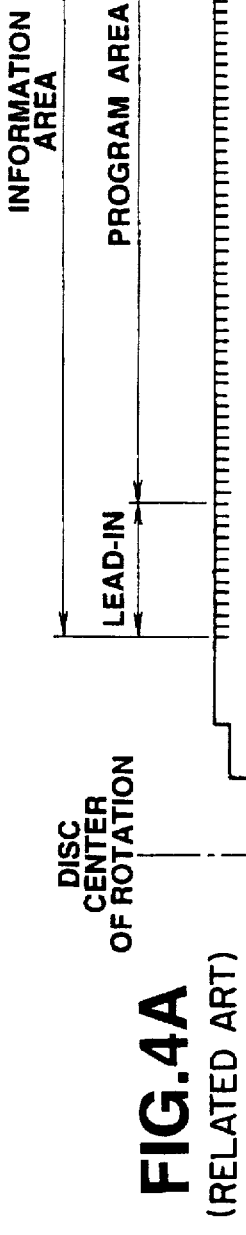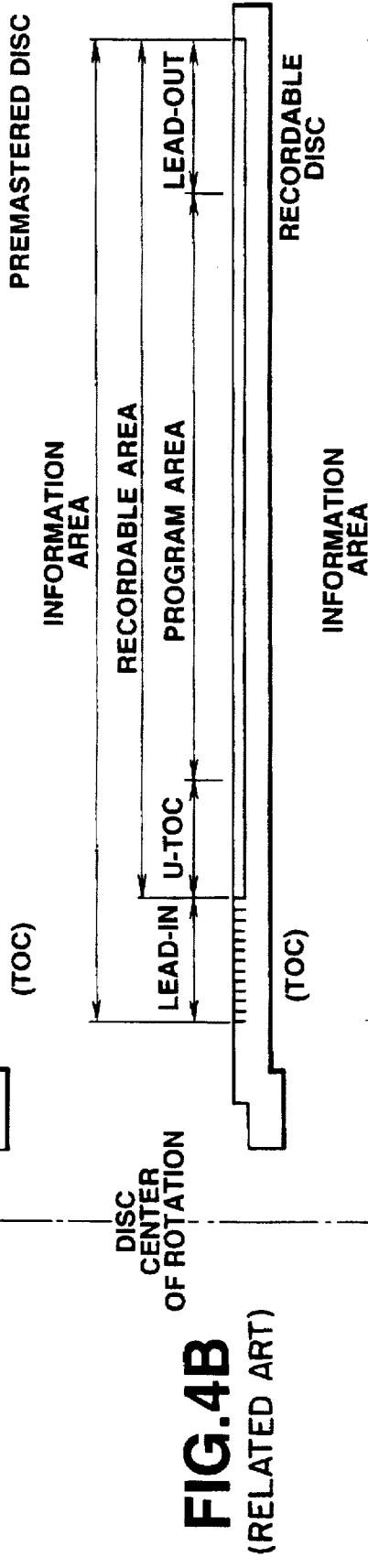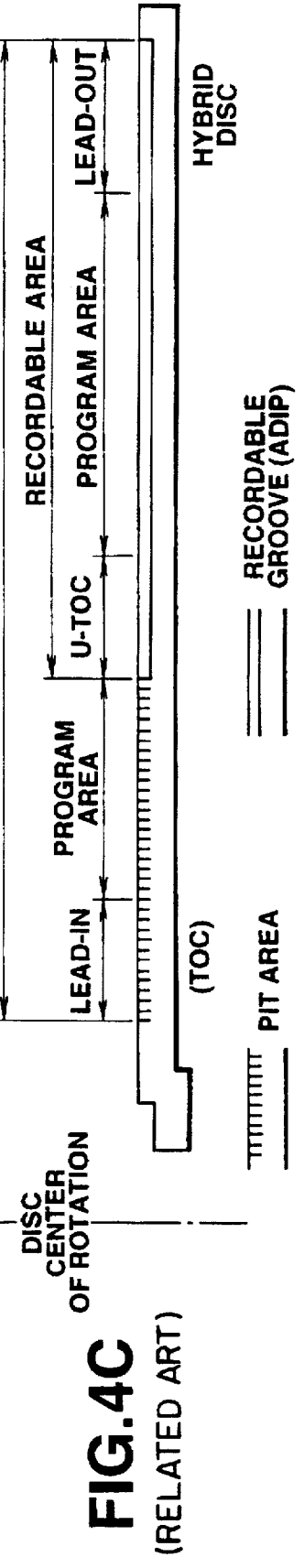
FIG.4A (RELATED ART)
FIG.4B (RELATED ART)
FIG.4C (RELATED ART)

DISC DRIVE DEVICE OPERABLE WITH DIFFERENT DISCS THAT MAY EXHIBIT DIFFERENT LINEAR VELOCITIES OR CIRCUMFERENTIAL RECORDING DENSITIES

BACKGROUND OF THE INVENTION

This invention relates to a disc device adapted to perform an access operation in a record or reproduction mode for disc-shaped recording media which differ from one another in linear velocity or circumferential recording density.

Optical discs have conventionally been employed as a recording medium, for example, compact discs (CD) and Mini Discs (MDs). MDs are classified according to their characteristics, into recordable discs capable of recording and reproducing data, read-only premastered discs, and hybrid discs, which have a recordable area and a premastered area. The various parameters and the recording densities used in different optical recording MDs are equivalent to those employed in various CDs.

FIGS. 4A to 4C schematically show disc formats of the above three types of MDs, namely, cross-sections of the premastered disc, the recordable disc and the hybrid disc, respectively.

In each of these discs, the innermost circular tracks of the information area are defined as a lead-in area, also called the table of contents (TOC), in which pre-recorded information (known as pit information) is used for setting the laser power and also provides basic information for recording or reproducing the disc, as the case may be. The remaining information area outside of the lead-in area of the disc is used as a pit area or a recordable grooved area depending on the characteristics of the disc, i.e., recordable, read-only or hybrid.

The recordable disc, shown in FIG. 4B, will now be described in detail with reference to FIG. 5. The recordable disc has a radius of greater than 30.5 mm. The recordable area begins 16.0 mm from the disc's center of rotation and extends 14.5 mm outward from that point.

In the recordable disc, cluster address information and sector address information, called address in pregroove (ADIP) signals, are recorded in a groove provided in the recordable area by wobbling the groove when the disc is molded. The wobbled groove enables the disc system controller to perform an access operation in a recording and a reproduction mode and to perform tracking control and spindle servo control to effect a constant linear velocity (CLV). The ADIP signal is produced by modulating a 22.05-kHz carrier signal with the address information. The modulated carrier signal wobbles the groove so that it meanders approximately 30 nm from a center line of the circumferential (or spiral) track. The optical pickup is capable of reading the address information formed by the wobbled groove separately from the recorded signal. In recording, information is recorded in clusters according to this address information.

FIG. 6 shows the data configuration of approximately one cluster of the recordable disc. In FIG. 6, one cluster is composed of a link area having three link sectors LS, one sub-data sector SS and a data area having thirty-two data sectors DS.

In the read-only disc, since data has been recorded onto the disc in continuous fashion, the three sectors forming the link area are not necessary and instead are allocated as sub-data sectors SS. Thus, the leading four sectors of a cluster in a read-only disc are sub-data sectors.

In a disc-shaped recording medium, such as CDs or MDs, it is necessary during a seek operation to determine the number of tracks by which the optical pickup should be moved to access the track at a specified address from the track on which the optical pickup is currently present.

Though CDs or MDs may have different linear velocities which result in different circumferential recording densities, information relating to or identifying the linear velocity or recording density is not recorded in the lead-in area (TOC) of these discs. Therefore, it is difficult to establish the linear velocity at an arbitrary position on the discs and there is a delay before the disc reaches a predetermined linear velocity when the optical pickup is moved to a target position during a seek operation.

In a conventional optical disc device for performing an access operation on different discs which exhibit different linear velocities or circumferential recording densities, the distance or the number of tracks by which the optical pickup is to be moved to access a track is calculated as a function of the target address (cluster and sector addresses). In this conventional system a large conversion error may be generated depending upon the linear velocity of the disc, and consequently the access time will be delayed.

SUMMARY AND OBJECTS OF THE INVENTION

In view of the foregoing, an object of the present invention is to provide a disc drive device which correctly obtains the distance or the number of tracks by which the optical pickup should be moved even when performing an access operation on different discs which exhibit different linear velocities or circumferential recording densities. It is a further object of the invention to optimize the access operation for discs of any linear velocity.

In accordance with the present invention, a disc drive device is provided for performing an access operation on different disc-shaped recording media exhibiting different linear velocities or circumferential recording densities. The disc drive device includes a linear velocity calculating unit for calculating the linear velocity of each of the disc-shaped recording media loaded onto the device as a function of the number of rotations of the disc-spin motor and the position information of the disc pickup head as the latter scans the disc-shaped recording medium. The disc drive device also includes a number-of-track generating unit for calculating the number of tracks to be moved by the head from the current head position to a target position as a function of the address of the target position and the linear velocity of the disc-shaped recording medium.

The linear velocity calculating unit determines the current position information of the head in relation to the disc-shaped recording medium in response either to an output from a head driving unit or to address information that may be recorded on the disc-shaped recording medium.

In the preferred embodiment, the number-of-track generating unit has a plurality of conversion tables which correlate the target position address and the corresponding number of tracks to reach that target from the current position. The correct conversion table is selected to calculate the number of tracks from the current position to the target position as a function of the linear velocity of the disc-shaped recording medium.

BRIEF DESCRIPTION OF THE DRAWINGS

The above, and other objects, features and advantages of the present invention will be apparent in the following detailed description of the preferred embodiments of the present invention when read in conjunction with the accompanying drawings in which corresponding parts are identified by the same reference numeral, and wherein:

FIGS. 4A to 4C are views showing different MD disc types and their recording layouts.

DETAILED DESCRIPTION OF THE PREFERRED EMBODIMENTS OF THE INVENTION

A preferred embodiment of the present invention will now be described with reference to the attached drawings.

Figure 1:
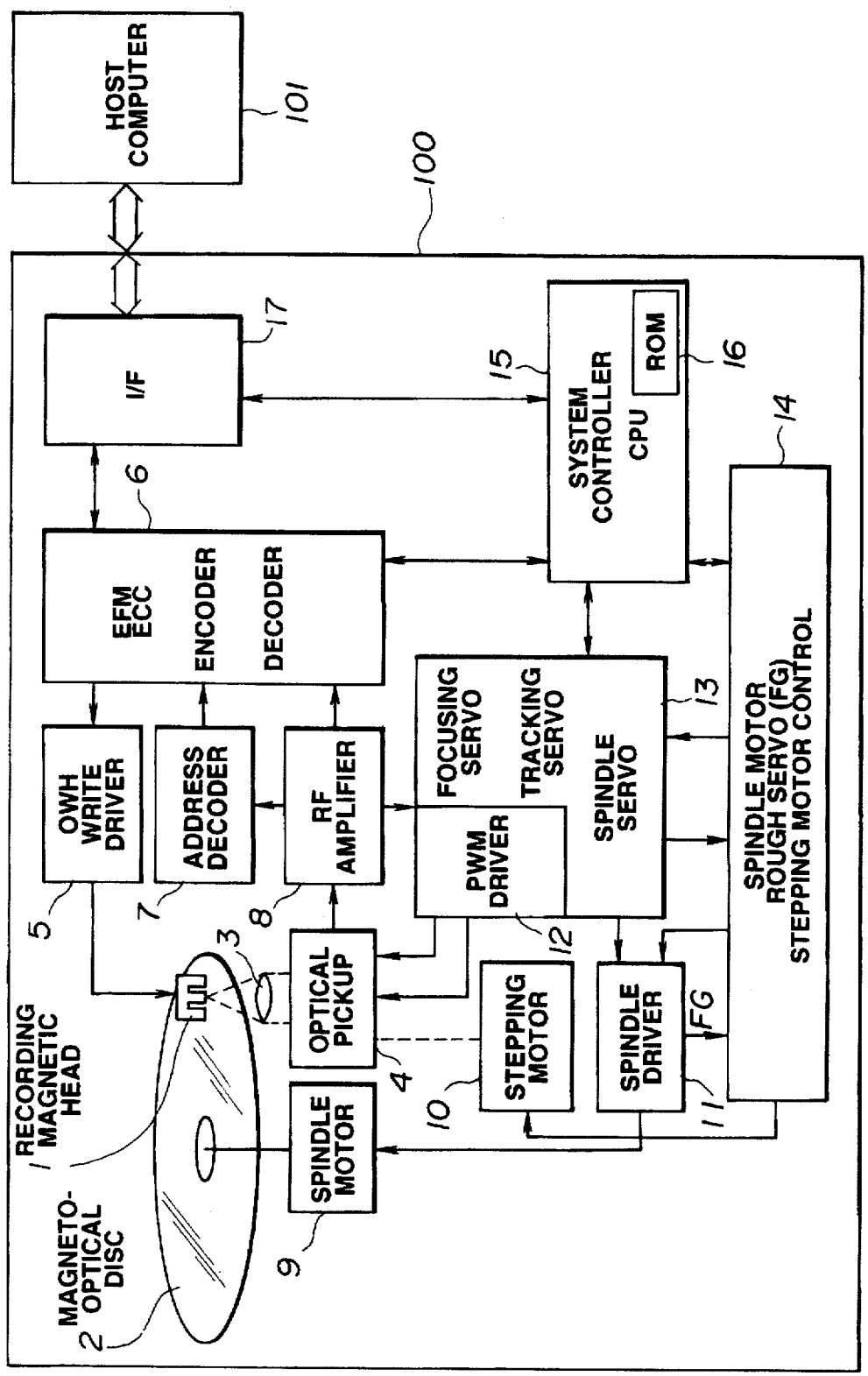
FIG. 1 is a block circuit diagram showing the structure of an optical disc drive device in accordance with a preferred embodiment of the present invention.

FIG. 1 is a block diagram of a disc drive device according to the present invention.

The disc drive device of this embodiment is an optical disc drive device 100 adapted for performing an access operation during a record or reproduction mode on different of optical discs, such as CDs or MDs, which have different linear velocities or circumferential recording densities. As shown in FIG. 1, the disc drive device includes a linear velocity calculating unit for calculating the velocity V [m/s] of a magneto-optical disc 2, as later described, as a function of the number of rotations of a spindle motor 9, which acts as a disc-spin motor to rotate the magneto-optical disc, and the radial position of an optical pickup 4 relative to the magneto-optical disc. The disc drive device 100 also includes a number-of-tracks generating unit for calculating the number of tracks from the current position of pickup 4 to a target position in response to the address of the target position and the calculated linear velocity V of the disc 2. The disc drive device has a system controller 15 which includes the linear velocity calculating unit and the number-of-tracks generating unit.

The linear velocity calculating unit determines position information of the optical pickup either in response to an output from the pickup drive unit, for example, the number of steps of a stepping motor 10 which advances optical pickup 4, or in response to address information recorded on magneto-optical disc 2 as an ADIP signal.

The number-of-tracks generating unit calculates the number of tracks from the current position to the target position by a predetermined conversion formula, as later described. The number-of-tracks generating unit preferably is provided with a plurality of conversion tables stored in a ROM 16, the addresses of which correspond to the target position and the data stored at each address representing the corresponding number of tracks to the target position from the current position. The correct table is selected to calculate the number of tracks from the current position to the target position based on the linear velocity of the magneto-optical disc.

In optical disc drive device 100, as shown in FIG. 1, the magneto-optical disc rotationally driven by spindle motor 9 is used as a recording medium.

Optical pickup 4 has optical components, such as a laser light source (e.g., a laser diode), a collimator lens, an objective lens 3, a polarization beam splitter, a cylindrical lens and a photodetector having a section for receiving a predetermined pattern of light. The optical pickup is positioned facing a recording magnetic head 1 with magneto-optical disc 2 located in-between. When data is to be recorded on the magneto-optical disc, the recording magnetic head is driven by an overwrite head (OWH) driver 5, which applies a modulated magnetic field corresponding to the recording data to the recording surface of the magneto-optical disc. At the same time, a target track of the magneto-optical disc is irradiated with a laser beam of predetermined power by the optical pickup via objective lens 3. Thus, thermomagnetic recording by magnetic field modulation is performed.

Data to be recorded is supplied from a host computer 101 and through an interface circuit (I/F) 17 is supplied to an encoder included in a signal processing circuit 6. The signal processing circuit converts the data into a recording signal by adding an error correction code and performing eight-to-fourteen modulation (EFM). The recording signal is then supplied to OWH driver 5, which drives recording magnetic head 1 with the recording signal. Simultaneously, optical pickup 4 is driven by a pulse width modulation (PWM) driver 12 so that the laser beam gains sufficient power for recording. Thus, the temperature of the surface of the recording track is raised to the Curie point.

During reproduction, the recording track of magneto-optical disc 2 is traced with the laser beam by optical pickup 4, to perform magneto-optical reproduction using the Kerr effect.

The optical pickup detects reflected light of the laser beam radiated onto the recording track of the magneto-optical disc and supplies a detection signal to an RF amplifier 8. The detection signal is comprised of several signal components, including a reproduction signal corresponding to the difference in the polarization angle (Kerr angle of rotation) of the reflected laser beam from the target track, a focusing error signal due to the astigmatic method used in recording and reproduction, a tracking error signal due to the push-pull method, and address information obtained from the above-mentioned wobbled groove.

RF amplifier 8 extracts the reproduction signal from the detection signal and supplies the reproduction signal to signal processing circuit 6. The signal processing circuit includes a decoder which performs EFM demodulation and error correction on the reproduction signal to generate reproduction data. The reproduction data is then supplied to host computer 101 via interface circuit 17.

The RF amplifier also extracts the focusing error signal and the tracking error signal from the detection signal and supplies these error signals to a servo circuit 13.

The servo circuit generates a focusing servo signal and a tracking servo signal in response to the extracted focusing error signal and the tracking error signal and supplies these servo signals through PWM driver 12 to the optical pickup. Thus, focusing servo and tracking servo operations are performed by the optical pickup. That is, focusing control of the optical system of the optical pickup 4 is performed so that the focusing error signal becomes zero and tracking control of the optical system of the optical pickup 4 is performed so that the tracking error signal becomes zero.

In addition, servo circuit 13 performs a rotary servo operation to control spindle motor 9 for rotating the magneto-optical disc. The servo circuit performs servo control of the spindle motor, via a spindle driver 11, to rotationally drive the magneto-optical disc at a predetermined speed, for example, a constant linear velocity (CLV).

A motor control circuit 14 performs rough servo control of the spindle motor in response to a frequency generator signal (FG signal) from the spindle driver. Motor control circuit 14 also performs rotation speed control (CLV control) of the magneto-optical disc in response to position information from the optical pickup to achieve constant linear velocity.

The optical pickup and recording magnetic head 1 are moved to the position of the target track of the magneto-optical disc specified by the system controller 15 of optical disc drive device 100. The movement of the optical pickup and the recording magnetic head is controlled by motor control circuit 14, which controls stepping motor 10 to drive a thread feeding unit which is mounted on the optical pickup. Stated more particularly, the system controller determines the radial position of the optical pickup from a count value representing the number of steps of the stepping motor generated in the motor control circuit. The system controller also is adapted to determine the radial position of the optical pickup from the address information recorded in the wobbled groove of the magneto-optical disc and read by the optical pickup.

An address decoder 7 generates an address signal and a frequency-modulated carrier signal in response to a signal corresponding to the wobbled groove on the magneto-optical disc, as extracted by RF amplifier 8. The address decoder supplies the address signal and the carrier signal to the decoder of signal processing circuit 6; and the signal processing circuit supplies the address signal and the carrier signal to system controller 15. The system controller compares the frequency-modulated carrier signal with a predetermined reference clock signal to control a spindle motor control section of motor control circuit 14.

The system controller, which includes a central processing unit (CPU), controls the operation of optical disc drive device 100 and the sending and receiving of data between the host computer 101 and interface circuit 17.

Determination by the present invention of the linear velocity of disc 2 and the conversion of the target address to the number of tracks to be moved by optical pickup 4 as a function of that linear velocity of the disc now will be described.

To access a track of a specified address from the track currently being traced by optical pickup 4, the number of tracks by which the optical pickup is to be moved must be determined. Depending upon the linear velocity or circumferential recording density of the magneto-optical disc being used, the relation between the address and the number of tracks is not constant. Therefore, the formula or the conversion table used to convert the address to the number of tracks must be varied.

Thus, this embodiment of the invention performs the following operation.

Figure 2:
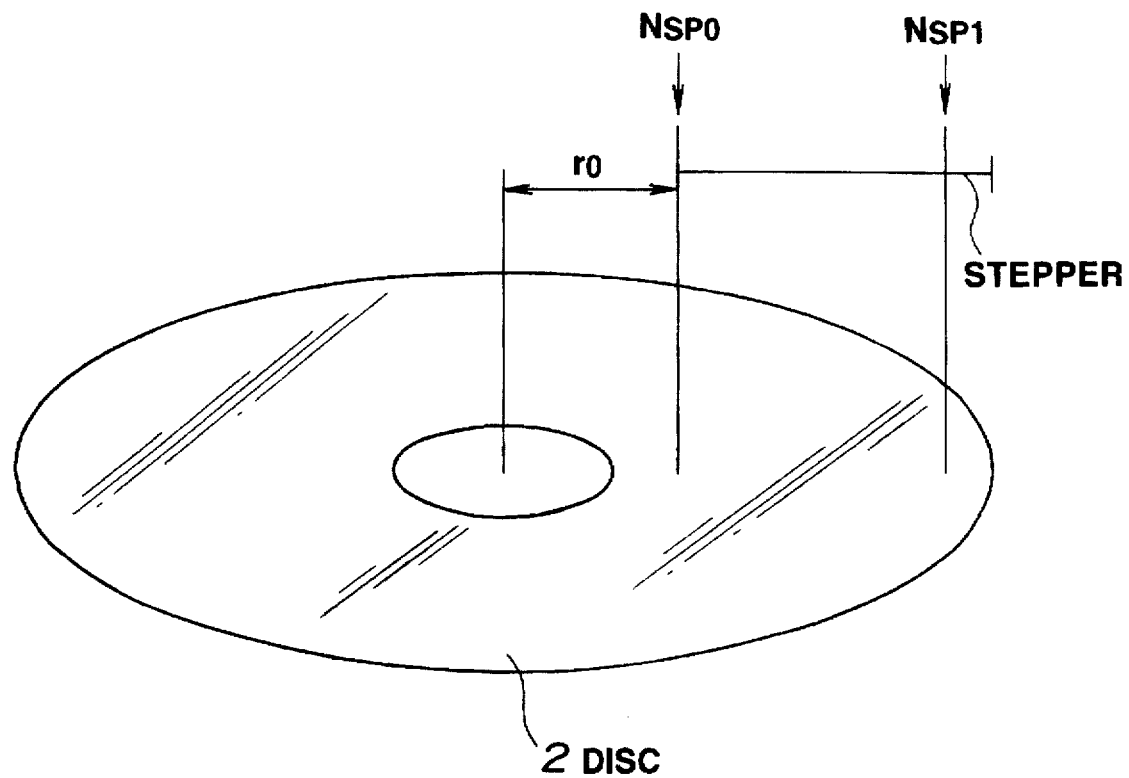
FIG. 2 is a schematic diagram showing a reference radial position r0 on a disc from which the head is driven by a stepping motor.

As shown in FIG. 2, cluster and sector addresses of a reference position on the magneto-optical disc are set to cluster address $0000_{(h)}$ and sector address $FC_{(h)}$, respectively, in hexadecimal notation. The radial position (the distance from the center of rotation of the magneto-optical disc) of cluster address $0000_{(h)}$ and sector address $FC_{(h)}$ is set to $r_o$ [m] and the sector frequency, the number of sectors scanned per period of time, is f [Hz].

The address of a current position being traced by the optical pickup is input to system controller 15 and the system controller determines the rotation speed of the disc by monitoring the FG signal from spindle driver 11 to drive spindle motor 9 (FIG. 1).

It is now assumed that the cluster and the sector corresponding to the target address are a and b, respectively, and that the resulting rotation speed is $N_r$ [rps]. In this case, when one cluster is composed of 36 sectors, the number of sectors $N_{ts}$ from the position of cluster address $0000_{(h)}$, sector address $FC_{(h)}$ to the position of cluster a, sector b is determined by the following equation.

$N_{ts}=36 \times a + b + 4$ (assuming that the target address is in the area radially outside of the TOC area). The linear velocity V of the disc is determined by the following equations:

$$V=1/2\{d\omega(1-p)+\sqrt{(d^2\omega^2(1-p)^2+4r_0^2\omega^2-4dr_0\omega^2)}\} \quad (1)$$

in the TOC area, and $$V=1/2\{-d\omega(1-p)+\sqrt{(d^2\omega^2(1-p)^2+4r_0^2\omega^2+4dr_0\omega^2)}\} \quad (2)$$

in the area radially outside of the TOC area, where $p=\omega N_{ts}/\pi f$ and $\omega=2\pi N_r$ [rad/s], d denotes a track pitch (in meters) equal to 1.6 μm (=1.6×10$^{-6}$ m) and $r_o$=16 mm=16×10$^{-3}$ m.

As mentioned above, the linear velocity V can be determined based on the number of sectors $N_{ts}$ from the reference position to the target position and the relationship between the rotation speed $N_r$ and the FG signal. Once the linear velocity V is determined by the equations mentioned above, a parameter indicative of the linear velocity is stored in the memory of system controller 15 until the magneto-optical disc is unloaded from optical disc drive device 100. In the event a request for reproduction is received by the optical disc drive device from host computer 101, the address to which the optical pickup should be moved is determined as follows.

When a target address distanced from cluster address $0000_{(h)}$, sector address FC(h) by a number of sectors $N_{ts}$ is sought, the number of tracks $N_{trk}$ by which the optical pickup should be moved is determined as follows. $N_{trk}$ is negative in the area radially inside of the cluster address 0000(h), sector address $FC_{(h)}$, and is positive in the area radially outside of the cluster address $0000_{(h)}$, sector address $FC_{(h)}$.

As shown in FIG. 2, the position having a distance r0 from the disc center (center of rotation) is set as a reference position or the origin. When the cluster address 0000(h), sector address $FC_{(h)}$ are set as the reference position, $r_o$=16 mm. The number of tracks $N_{trk}$ counted from this reference position to the target position of cluster address $Adc_{(h)}$, sector address $Ads_{(h)}$ is determined by the following equations.

When $Adc(h)=FFxx_{(h)}$, $$N_{trk}=-1/2d\{-\sqrt{((d-2r_0)^2-4dN_{ts}V/\pi f)}-d+2r_0\} \quad (3)$$

$N_{ts}=(FFFF_{(h)}-Adc_{(h)}) \times 24_{(h)}+24_{(h)}-(Ads_{(h)}+4_{(h)})$

When $Adc_{(h)} \neq FFxx_{(h)}$, $$N_{trk}=1/2d\{+\sqrt{((d+2r_0)^2+4dN_{ts}V/\pi f)}-d-2r_0\} \quad (4)$$

$N_{ts}=Adc_{(h)} \times 24_{(h)}+24_{(h)}+Ads_{(h)}+4_{(h)}$

In the above equations, d=1.6 μm (track pitch), $r_0$=16 mm, V=1.2 m/s to 1.4 m/s, f=75 Hz (sector frequency), and $N_{ts}$=the number of sectors to the target. Also, $4_{(h)}$ is added so as to perform 1-byte operation.

The calculation to convert the number of sectors $N_{ts}$ to the number of tracks $N_{trk}$ is performed as follows.

When the linear velocity V, which is calculated by either equation (1) or (2) above, is 1.2 m/s, the number of tracks $N_{trk}$ is calculated by the following equations.

When $Adc(h)=FFxx_{(h)}$ (the target position is in the TOC area), $$N_{trk}=-1/2d\{-\surd((d-2r_0)^2-4dN_{ts}V/rf)-d+2r_0\}=-312.5\times(-\surd(1023.898-0.03259\times N_{ts})+31.9984)$$

where $N_{ts}$ denotes the number of sectors from cluster address 0000(h), sector address FC(h) to the target address.

The number of sectors $N_{ts}$ from the reference position to the target position of, for example, cluster address $Adc_{(h)}=FF2C_{(h)}$, sector address $Ads_{(h)}=13_{(h)}$ is expressed as follows.

$$N_{ts}=(FFFF_{(h)}-FFC2_{(h)})\times 24_{(h)}+24_{(h)}-(13_{(h)}+4_{(h)})=61_{(d)}\times 36_{(d)}+26_{(d)}-23_{(d)}=2209 \text{ [sectors] in decimal notation.}$$

Thus, the number of tracks $N_{trk}$ is expressed by the following equation.

$$N_{trk}=-312.5\times(-\surd(1023.898-0.03259\times 2209)+31.9984)=-357.94$$

That is, the position of cluster address $FFC2_{(h)}$, sector address $13_{(h)}$ is 357.9 tracks radially inside of the reference position.

When $Adc_{(h)} \neq FFxx_{(h)}$ (that is, the target is in the area radially outside of the reference position), $$N_{trk}=1/2d\{\surd((d+2r_0)^2+4dN_{ts}V/rf)-d-2r_0\}=+312.5\times(\surd(1024.10+0.03259\times N_{ts})-32.0016)$$

The number of sectors $N_{ts}$ from the reference position to the position of, for example, cluster address $Adc_{(h)}=0400_{(h)}$, sector address $Ads_{(h)}=FD_{(h)}$ is expressed by the following equation.

$$N_{ts}=0400_{(h)}\times 24_{(h)}+FD_{(h)}+4_{(h)}=36864_{(d)}+2_{(d)}=36866 \text{ [sectors]}$$

Thus, the number of tracks $N_{trk}$ is expressed by the following equation.

$$N_{trk}=312.5\times(\surd(1024.10+0.03259\times 36866)-32.0016)=4741.96$$

That is, the position of cluster address $0400_{(h)}$, sector address $FD_{(h)}$ is 4741.9 tracks radially outside of the reference position (cluster address $0000_{(h)}$, sector address $FC_{(h)}$).

In the foregoing embodiment, the conversion of the target address to the number of tracks is performed by calculation. However, conversion tables as shown in Tables 1 to 5 may be used. In this embodiment, the conversion tables are stored in ROM 16 located in system controller 15. Thus, by using the conversion tables stored in the ROM, the system controller is capable of converting the target address to the number of tracks to be moved by optical pickup 4 without performing a mathematical calculation. The conversion table for linear velocity V=1.20 m/s is shown in Tables 1 and 2. The conversion table for linear velocity V=1.40 m/s is shown in Tables 3 to 5. In these tables, dTrack indicates the number of tracks in one cluster, that is, track/cluster.

TABLE 1

| cluster | | Track | dTrack | 16*dTrack | | |
|---|---|---|---|---|---|---|
| −152 | FF68 | −982.52 | FC60 | 6.42 | 102.70 | 103 | 103 |
| −149 | FF6B | −909.27 | FC73 | 6.41 | 102.49 | 102 | 102 |
| −135 | FF79 | −820.00 | FCCC | 6.34 | 101.49 | 101 | 101 |
| −120 | FF88 | −725.31 | FD2B | 6.28 | 100.46 | 100 | 100 |
| −105 | FF97 | −631.58 | FD89 | 6.22 | 99.45 | 99 | 99 |
| −90 | FFA6 | −538.77 | FDE6 | 6.15 | 98.48 | 98 | 98 |
| −74 | FFB6 | −440.77 | FE48 | 6.09 | 97.47 | 97 | 97 |
| −58 | FFC6 | −343.76 | FEA9 | 6.03 | 96.49 | 96 | 96 |
| −41 | FFD7 | −241.75 | FF0F | 5.97 | 95.48 | 95 | 95 |
| −23 | FFE9 | −134.89 | FF7A | 5.90 | 94.45 | 94 | 94 |
| −5 | FFFB | −29.17 | FFE3 | 5.84 | 93.45 | 93 | 93 |
| 0 | 0000 | 0.00 | 0000 | 5.82 | 93.17 | 93 | 93 |
| 13 | 000D | 75.44 | 004B | 5.78 | 92.48 | 92 | 92 |
| 32 | 0020 | 184.70 | 00B8 | 5.72 | 91.49 | 91 | 91 |
| 52 | 0034 | 298.45 | 012A | 5.65 | 90.48 | 90 | 90 |
| 72 | 0048 | 410.96 | 019A | 5.59 | 89.50 | 89 | 89 |
| 94 | 005E | 533.33 | 0215 | 5.53 | 88.46 | 88 | 88 |
| 115 | 0073 | 648.83 | 0288 | 5.47 | 87.50 | 87 | 87 |
| 138 | 008A | 773.91 | 0305 | 5.41 | 86.48 | 86 | 86 |
| 162 | 00A2 | 902.90 | 0386 | 5.34 | 85.46 | 85 | 85 |
| 186 | 008A | 1030.38 | 0406 | 5.28 | 84.47 | 84 | 84 |
| 211 | 00D3 | 1161.62 | 0489 | 5.22 | 83.48 | 83 | 83 |
| 237 | 00ED | 1296.50 | 0510 | 5.16 | 82.49 | 82 | 82 |
| 264 | 0108 | 1434.88 | 059A | 5.09 | 81.49 | 81 | 81 |
| 292 | 0124 | 1576.63 | 0628 | 5.03 | 80.49 | 80 | 80 |
| 321 | 0141 | 1721.64 | 0689 | 4.97 | 79.50 | 79 | 79 |
| 352 | 0160 | 1874.70 | 0752 | 4.90 | 78.47 | 78 | 78 |
| 383 | 017F | 2025.81 | 07E9 | 4.84 | 77.49 | 77 | 77 |
| 416 | 01A0 | 2184.60 | 0888 | 4.78 | 76.48 | 76 | 76 |
| 450 | 01C2 | 2346.08 | 092A | 4.72 | 75.48 | 75 | 75 |
| 485 | 01E5 | 2510.12 | 09CE | 4.66 | 74.49 | 74 | 74 |

TABLE 2

| cluster | | Track | dTrack | 16*dTrack | | |
|---|---|---|---|---|---|---|
| −152 | FF68 | −1073.69 | FBCF | 7.49 | 119.77 | 120 | 120 |
| −149 | FF6B | −1051.25 | FBE5 | 7.47 | 119.47 | 119 | 119 |
| −139 | FF75 | −976.86 | FC30 | 7.41 | 118.48 | 118 | 118 |
| −128 | FF80 | −895.73 | FC81 | 7.34 | 117.43 | 117 | 117 |
| −118 | FF8A | −822.61 | FCCA | 7.28 | 116.49 | 116 | 116 |
| −107 | FF95 | −742.83 | FD1A | 7.22 | 115.49 | 115 | 115 |
| −95 | FFA1 | −656.58 | FD70 | 7.15 | 114.42 | 114 | 114 |
| −84 | FFAC | −578.22 | FDBE | 7.09 | 113.47 | 113 | 113 |
| −72 | FFB8 | −493.46 | FE13 | 7.03 | 112.46 | 112 | 112 |
| −60 | FFC4 | −409.45 | FE67 | 6.97 | 111.48 | 111 | 111 |
| −47 | FFD1 | −319.27 | FEC1 | 6.90 | 110.44 | 110 | 110 |
| −34 | FFDE | −229.92 | FF1B | 6.84 | 109.43 | 109 | 109 |
| −21 | FFEB | −141.37 | FF73 | 6.78 | 108.45 | 108 | 108 |
| −8 | FFF8 | −53.62 | FFCB | 6.72 | 107.49 | 107 | 107 |
| 0 | 0000 | 0.00 | 0000 | 6.68 | 106.92 | 107 | 107 |
| 6 | 0006 | 40.03 | 0028 | 6.66 | 106.49 | 106 | 106 |
| 21 | 0015 | 139.40 | 008B | 6.59 | 105.45 | 105 | 105 |
| 36 | 0024 | 237.81 | 00ED | 6.53 | 104.43 | 104 | 104 |
| 51 | 0033 | 335.29 | 014F | 6.47 | 103.45 | 103 | 103 |
| 66 | 0042 | 431.85 | 01AF | 6.41 | 102.49 | 102 | 102 |
| 83 | 0053 | 540.22 | 021C | 6.34 | 101.44 | 101 | 101 |
| 99 | 0063 | 641.21 | 0281 | 6.28 | 100.48 | 100 | 100 |
| 116 | 0074 | 747.47 | 02EB | 6.22 | 99.49 | 99 | 99 |
| 134 | 0086 | 858.84 | 035A | 6.15 | 98.47 | 98 | 98 |
| 152 | 0098 | 969.09 | 03C9 | 6.09 | 97.48 | 97 | 97 |

TABLE 3

| cluster | | Track | dTrack | 16*dTrack | | |
|---|---|---|---|---|---|---|
| 171 | 00AB | 1084.27 | 043C | 6.03 | 96.46 | 96 | 96 |
| 190 | 00BE | 1198.26 | 04AE | 5.97 | 95.48 | 95 | 95 |
| 210 | 00D2 | 1317.02 | 0525 | 5.91 | 94.48 | 94 | 94 |
| 231 | 00E7 | 1440.39 | 05A0 | 5.84 | 93.46 | 93 | 93 |
| 252 | 00FC | 1562.44 | 061A | 5.78 | 92.48 | 92 | 92 |
| 274 | 0112 | 1688.93 | 0688 | 5.72 | 91.48 | 91 | 91 |

TABLE 3-continued

| cluster | Track | | dTrack | 16*dTrack | | |
|---|---|---|---|---|---|---|
| 297 | 0129 | 1819.73 | 071B | 5.65 | 90.46 | 90 | 90 |
| 320 | 0140 | 1949.09 | 079D | 5.59 | 89.49 | 89 | 89 |
| 344 | 0158 | 2082.61 | 0822 | 5.53 | 88.50 | 88 | 88 |
| 370 | 0172 | 2225.60 | 08B1 | 5.47 | 87.46 | 87 | 87 |
| 396 | 018C | 2366.94 | 093E | 5.40 | 86.46 | 86 | 86 |
| 422 | 01A6 | 2506.69 | 09CA | 5.34 | 85.50 | 85 | 85 |
| 450 | 01C2 | 2655.46 | 0A5F | 5.28 | 84.49 | 84 | 84 |
| 479 | 01DF | 2807.72 | 0AF7 | 5.22 | 83.49 | 83 | 83 |
| 509 | 01FD | 2963.34 | 0B93 | 5.16 | 82.49 | 82 | 82 |
| 540 | 021C | 3122.22 | 0C32 | 5.09 | 81.49 | 81 | 81 |
| 572 | 023C | 3284.23 | 0CD4 | 5.03 | 80.50 | 80 | 80 |
| 606 | 025E | 3454.23 | 0D7E | 4.97 | 79.48 | 79 | 79 |
| 640 | 0280 | 3622.10 | 0E26 | 4.91 | 78.50 | 78 | 78 |
| 677 | 02A5 | 3802.47 | 0EDA | 4.84 | 77.47 | 77 | 77 |
| 714 | 02CA | 3980.51 | 0F8C | 4.78 | 76.49 | 76 | 76 |
| 753 | 02F1 | 4165.76 | 1045 | 4.72 | 75.49 | 75 | 75 |
| 794 | 031A | 4357.92 | 1105 | 4.65 | 74.48 | 74 | 74 |
| 836 | 0344 | 4552.15 | 11CB | 4.59 | 73.48 | 73 | 73 |
| 880 | 0370 | 4752.88 | 1290 | 4.53 | 72.48 | 72 | 72 |

TABLE 4

| cluster | Track | | dTrack | 16*dTrack | | |
|---|---|---|---|---|---|---|
| 522 | 020A | 2681.24 | 0A79 | 4.59 | 73.48 | 73 | 73 |
| 560 | 0230 | 2854.60 | 0B26 | 4.53 | 72.49 | 72 | 72 |
| 600 | 0258 | 3034.60 | 0BDA | 4.47 | 71.49 | 71 | 71 |
| 642 | 0282 | 3220.96 | 0C94 | 4.41 | 70.48 | 70 | 70 |
| 685 | 02AD | 3409.08 | 0D51 | 4.34 | 69.49 | 69 | 69 |
| 731 | 02DB | 3607.44 | 0E17 | 4.28 | 68.48 | 68 | 68 |
| 778 | 030A | 3807.18 | 0EDF | 4.22 | 67.49 | 67 | 67 |
| 828 | 033C | 4016.53 | 0FB0 | 4.16 | 66.48 | 66 | 66 |
| 880 | 0370 | 4231.00 | 1086 | 4.09 | 65.48 | 65 | 65 |
| 934 | 03A6 | 4450.34 | 1162 | 4.03 | 64.49 | 64 | 64 |
| 991 | 03DF | 4678.31 | 1246 | 3.97 | 63.49 | 63 | 63 |
| 1050 | 041A | 4910.62 | 132E | 3.91 | 62.50 | 62 | 62 |
| 1113 | 0459 | 5154.74 | 1422 | 3.84 | 61.49 | 61 | 61 |
| 1179 | 049B | 5406.34 | 151E | 3.78 | 60.49 | 60 | 60 |
| 1248 | 04E0 | 5665.05 | 1621 | 3.72 | 59.49 | 59 | 59 |
| 1320 | 0528 | 5930.53 | 172A | 3.66 | 58.50 | 58 | 58 |
| 1397 | 0575 | 6209.64 | 1841 | 3.59 | 57.49 | 57 | 57 |
| 1477 | 05C5 | 6494.62 | 195E | 3.53 | 56.50 | 56 | 56 |
| 1562 | 061A | 6792.12 | 1A88 | 3.47 | 55.50 | 55 | 55 |
| 1652 | 0674 | 7101.47 | 1B8D | 3.41 | 54.49 | 54 | 54 |
| 1747 | 06D3 | 7422.05 | 1CFE | 3.34 | 53.49 | 53 | 53 |
| 1847 | 0737 | 7753.26 | 1E49 | 3.28 | 52.49 | 52 | 52 |
| 1953 | 07A1 | 8097.71 | 1FA1 | 3.22 | 51.49 | 51 | 51 |
| 2065 | 0811 | 8454.69 | 2106 | 3.16 | 50.50 | 50 | 50 |
| 2185 | 0889 | 8829.65 | 227D | 3.09 | 49.49 | 49 | 49 |
| 2311 | 0907 | 9215.48 | 23FF | 3.03 | 48.50 | 48 | 48 |
| 2446 | 098E | 9620.46 | 2594 | 2.97 | 47.50 | 47 | 47 |
| 2590 | 0A1E | 10043.42 | 273B | 2.91 | 46.50 | 46 | 46 |
| 2743 | 0AB7 | 10483.25 | 28F3 | 2.84 | 45.50 | 45 | 45 |
| 2907 | 0B5B | 10944.44 | 2AC0 | 2.78 | 44.50 | 44 | 44 |
| 3082 | 0C0A | 11425.62 | 2CA1 | 2.72 | 43.50 | 43 | 43 |

TABLE 5

| cluster | Track | | dTrack | 16*dTrack | | |
|---|---|---|---|---|---|---|
| 926 | 039E | 4959.85 | 135F | 4.47 | 71.48 | 71 | 71 |
| 973 | 03CD | 5168.41 | 1430 | 4.41 | 70.50 | 70 | 70 |
| 1023 | 03FF | 5387.17 | 150B | 4.34 | 69.50 | 69 | 69 |
| 1075 | 0433 | 5611.44 | 15EB | 4.28 | 68.50 | 68 | 68 |
| 1130 | 046A | 5845.18 | 16D5 | 4.22 | 67.49 | 67 | 67 |
| 1187 | 04A3 | 6083.85 | 17C3 | 4.16 | 66.49 | 66 | 66 |
| 1246 | 04DE | 6327.21 | 18B7 | 4.09 | 65.50 | 65 | 65 |
| 1309 | 051D | 6583.14 | 19B7 | 4.03 | 64.49 | 64 | 64 |
| 1374 | 055E | 6843.11 | 1ABB | 3.97 | 63.49 | 63 | 63 |
| 1442 | 05A2 | 7110.85 | 1BC6 | 3.91 | 62.50 | 62 | 62 |
| 1514 | 05EA | 7389.85 | 1CDD | 3.84 | 61.50 | 61 | 61 |
| 1590 | 0636 | 7679.57 | 1DFF | 3.78 | 60.49 | 60 | 60 |

TABLE 5-continued

| cluster | Track | | dTrack | 16*dTrack | | |
|---|---|---|---|---|---|---|
| 1669 | 0685 | 7975.79 | 1F27 | 3.72 | 59.49 | 59 | 59 |
| 1752 | 06D8 | 8281.83 | 2059 | 3.66 | 58.50 | 58 | 58 |
| 1840 | 0730 | 8600.80 | 2198 | 3.59 | 57.49 | 57 | 57 |
| 1932 | 078C | 8928.53 | 22E0 | 3.53 | 56.50 | 56 | 56 |
| 2030 | 07EE | 9271.51 | 2437 | 3.47 | 55.49 | 55 | 55 |
| 2133 | 0855 | 9625.52 | 2599 | 3.41 | 54.49 | 54 | 54 |
| 2241 | 08C1 | 9989.99 | 2705 | 3.34 | 53.50 | 53 | 53 |
| 2356 | 0934 | 10370.91 | 2882 | 3.28 | 52.50 | 52 | 52 |
| 2478 | 09AE | 10767.38 | 2A0F | 3.22 | 51.50 | 51 | 51 |
| 2607 | 0A2F | 11178.53 | 2BAA | 3.16 | 50.50 | 50 | 50 |
| 2744 | 0AB8 | 11606.61 | 2D56 | 3.09 | 49.50 | 49 | 49 |
| 2889 | 0B49 | 12050.64 | 2F12 | 3.03 | 48.50 | 48 | 48 |
| 3044 | 0FE4 | 12515.61 | 30E3 | 2.97 | 47.50 | 47 | 47 |

An example of using the foregoing tables to determine the number of tracks to the position of cluster address $100_{(h)}$, sector address $02_{(h)}$ now will be described.

A range including cluster address 100(h) is sought in Tables 1 and 2 if the linear velocity V=1.20 m/s. In this example $ED_{(h)} < 100_{(h)} < 108_{(h)}$, so the number of clusters from cluster address $ED_{(h)}$, sector address $FC_{(h)}$ to the position of cluster address $100_{(h)}$, sector address $02_{(h)}$ is calculated as follows.

$$100_{(h)} - ED_{(h)} = 13_{(h)}$$

$$02_{(h)} - FC_{(h)} = 6_{(h)}$$

From the results of these equations, the following calculation is made.

$$13_{(h)} + 6_{(h)}/24_{(h)} = 19.25 \text{ (decimal)}$$

Thus, the position of cluster address $100_{(h)}$, sector address $02_{(h)}$ is 19.25 clusters from cluster address $ED_{(h)}$, sector address $FC_{(h)}$ identified in Table 2.

Accordingly, the number of tracks is determined as follows.

1296.50+5.16 (the number of tracks per cluster)×19.25=1395.83 (decimal)≈1395

Figure 3:
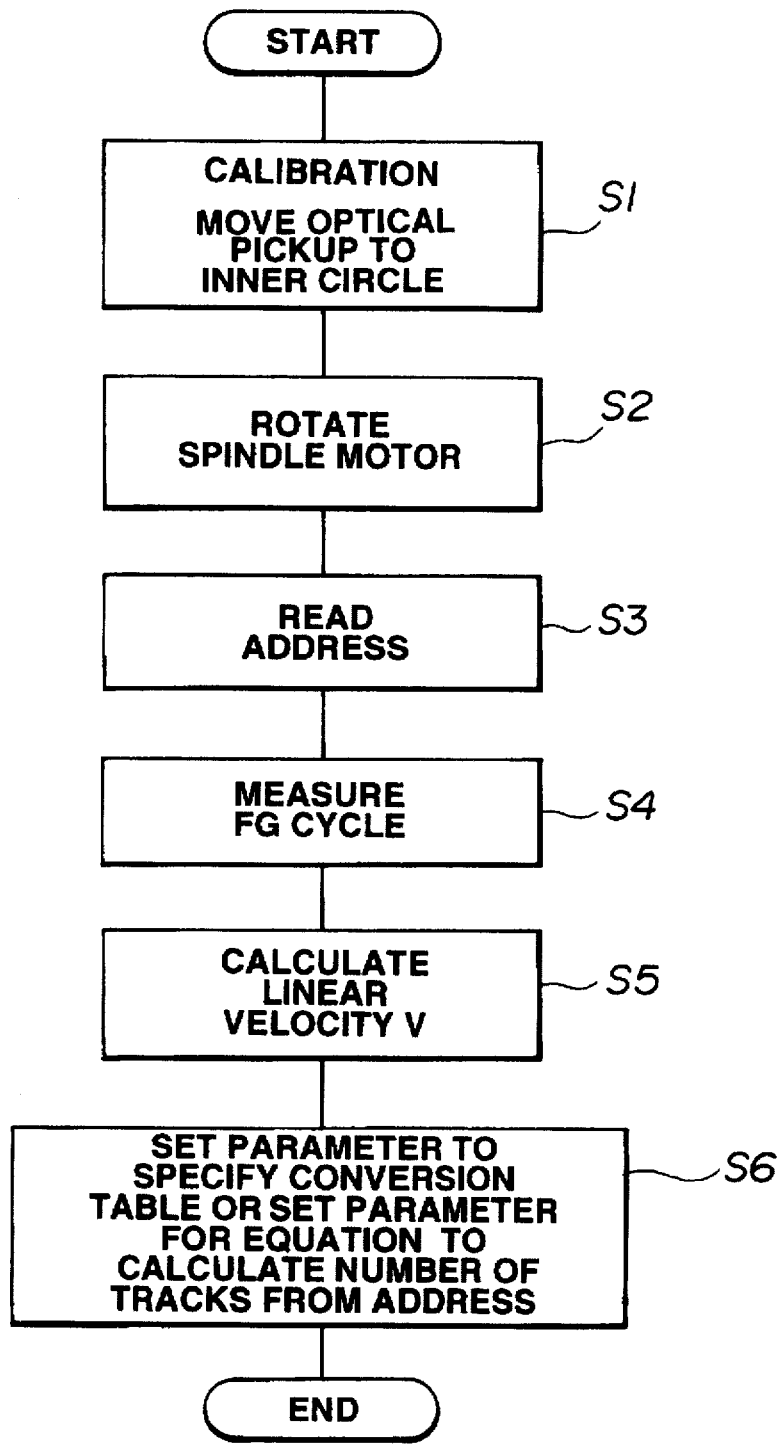
FIG. 3 is a flowchart showing the manner in which the head is driven to a target track in accordance with this invention.
Figure 5:
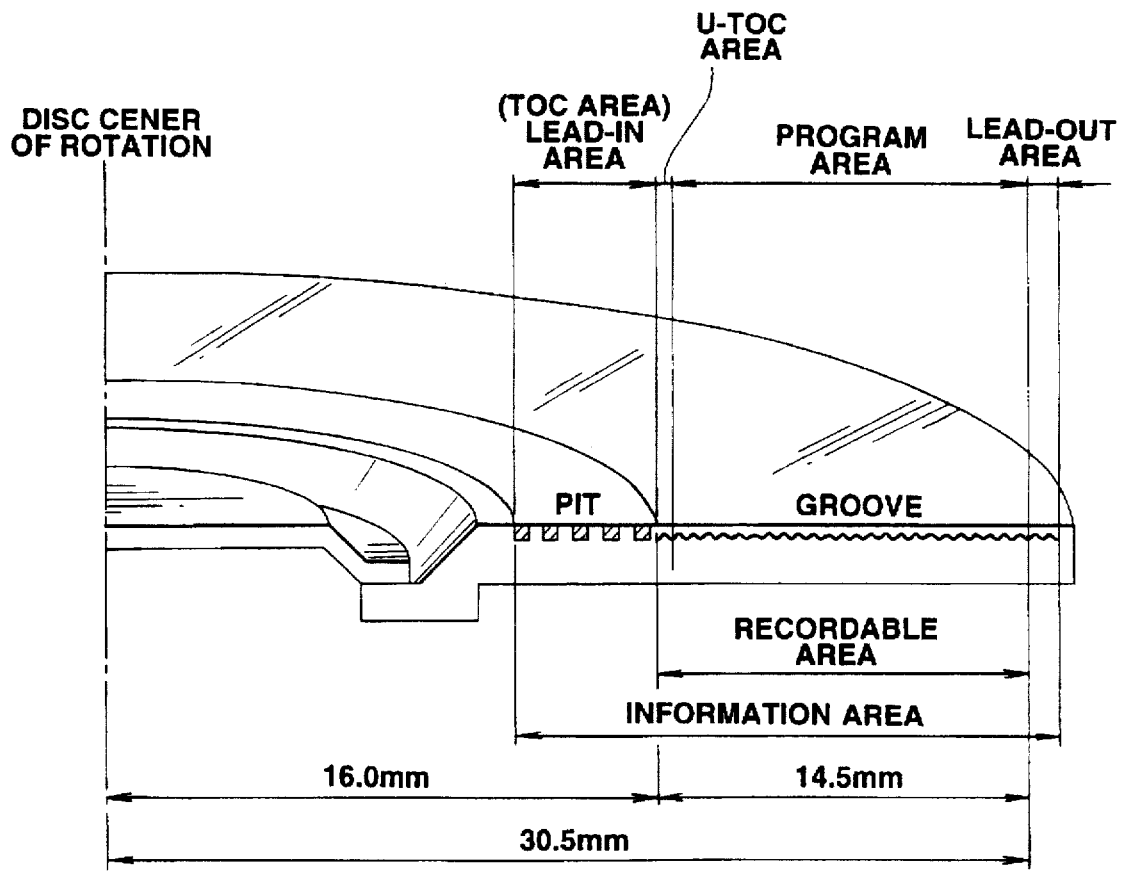
FIG. 5 is a schematic diagram of a recordable MD disc format.
Figure 6:
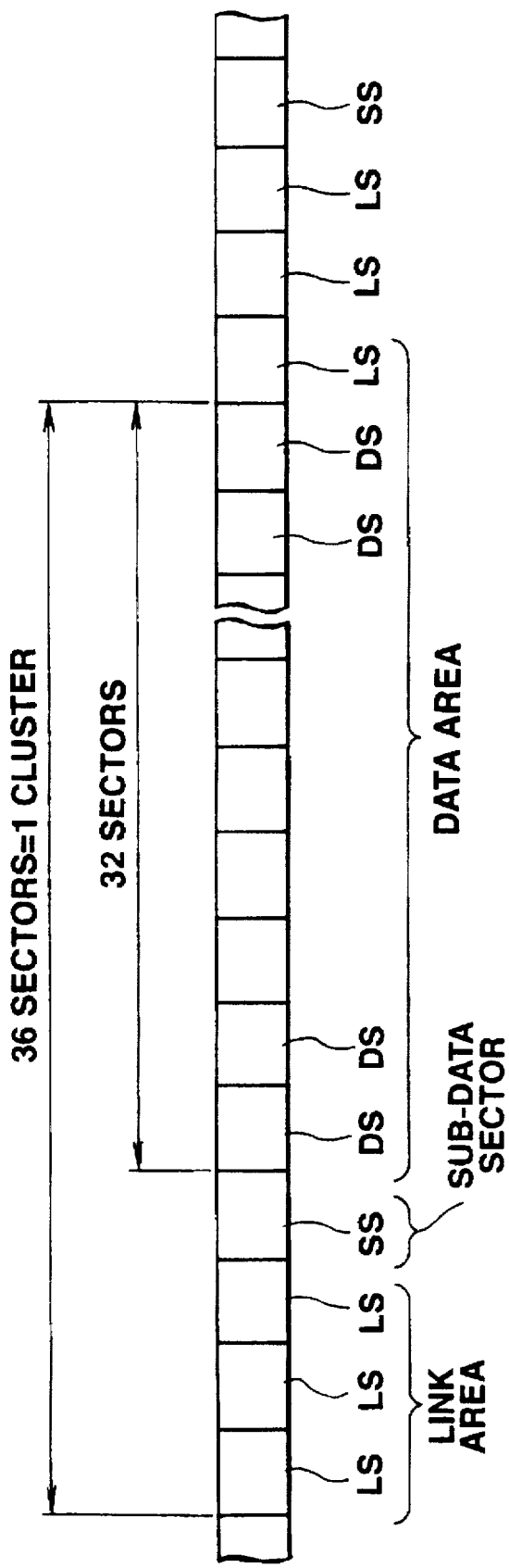
FIG. 6 is illustrative of the structure of approximately one cluster of a recordable MD disc.

FIG. 3 is a flow chart of the manner in which system controller 15 processes linear velocity calculation, address calculation and conversion of the address to the number of tracks for the optical pickup to be moved in disc drive device 100.

After loading of the magneto-optical disc into optical disc drive device 100, system controller 15 performs calibration step S1 and sends a control signal to the motor control circuit to control stepping motor 10 to move optical pickup 4 to the innermost radius of the magneto-optical disc, so that the optical pickup can reproduce the information contained in the table of contents (TOC).

Then, step S2 is performed, whereby the motor control circuit controls spindle motor 9 through spindle driver 11 in response to a signal from the system controller to perform rough servo (CLV control) of the spindle motor in response to the FG signal which is output from the spindle driver, in a manner known to those of ordinary skill in the art.

When the optical pickup is placed near the TOC area on the magneto-optical disc and the motor control circuit performs rough servo of the spindle motor, RF amplifier 8 is able to extract the reproduction signal, the focusing error signal, and the tracking error signal from the detection signal. Then, the system controller sends a control signal to execute the focusing and tracking servo operation of servo circuit 13. In addition, since the servo circuit acts as the servo control for rotating the magneto-optical disc, the system controller switches the servo control for rotation of the spindle motor from the motor control circuit to the servo control circuit. Address decoder 7 generates the address signal in response to the signal corresponding to the wobbled groove on the magneto-optical disc extracted by the RF amplifier, and the system controller performs step S3 to read this generated address and determine the current cluster address and sector address of optical pickup 4.

Next, the system controller executes step S4 and measures the cycle of the FG signal from spindle driver 11 which denotes the approximate rotational speed of the magneto-optical disc.

The system controller then carries out step S5 to calculate the linear velocity V of the magneto-optical disc as a function of the current address and the cycle of the FG signal.

The linear velocity V determined by the above process, or a substitute parameter indicative of the linear velocity V, is stored in a memory, such as ROM 16, of the system controller. The system controller then performs step S6 which selects the proper conversion table for converting the address (current or target) to the number of tracks to be moved by optical pickup 4 or, alternatively, the linear velocity, is used to select the parameters for equations (3) or (4) to calculate the number of tracks from the current position (or address).

In the event that the system controller receives a request for reproduction, recording, or access (seek) from host computer 101 through interface circuit 17, the system controller determines from the address of the current position of the optical pickup the target cluster and sector address as a function of equations (3) or (4) or the conversion tables. The system controller also determines the number of tracks which the optical pickup should be moved (jumped) to reach the target address from the current address. To drive the pickup to the target position, the system controller switches the servo control for rotation of spindle motor 9 from servo circuit 13 to the rough servo control of motor control circuit 14. Then, the system controller supplies a signal to control the pickup motor control circuit to move the optical pickup to the target address. The pickup motor control circuit generates the number of steps for stepping motor 10 to advance in response to the numbers of tracks input from the system controller and controls the stepping motor to step the correct number of tracks. When the counted number of tracks corresponds to the number of steps, the stepping motor stops.

In this embodiment, the movement of the optical pickup is performed by the stepping motor, however, it can be accomplished by using any other motors, such as a servo-controlled DC motor or the like. Also, in this embodiment, the system controller controls the pickup motor control circuit as a function of the address signal reproduced by address decoder 7 while the optical pickup is moving to the target address from the current address.

As is described above, with the device of this invention, the linear velocity of the magneto-optical disc is calculated from the frequency signal FG which, in turn, is a function of the number of rotations of the spindle motor for rotating the magneto-optical disc, and from the position in the radial direction of the optical pick up; and the number of tracks from the current position to the target position is determined by using the calculated linear velocity and the address of the target position. According to the invention, by calculating the number of tracks as a function of the linear velocity of the magneto-optical disc or by selecting the proper conversion table for converting the target address to the number of tracks to be moved by optical pickup 4 as a function of the linear velocity of the disc, the distance or the number of tracks from the current position to the target position can be correctly determined. Accordingly, the seek operation can be optimized for discs exhibiting different linear velocities and quick access can be realized.

In the above-described embodiments, magneto-optical discs, such as MDs, constitute the disc-shaped recording medium. However, the same effects can be obtained when using a CD, a re-writable optical disc of phase change type or a magnetic disk.

In the present invention as described above, the linear velocity of the disc-shaped recording medium is determined as a function of the number of rotations of the spin motor which rotates the disc-shaped recording medium and also as a function of the head position in the radial direction of the disc-shaped recording medium. The number of tracks to move the head from the current position to the target position is determined by using the address of the target position and the linear velocity. By reason of this invention, the distance or the number of tracks by which the optical pickup should be moved during the seek operation can be correctly determined even when the disc drive uses different disc-shaped recording media exhibiting different linear velocities or circumferential recording densities.

Having described preferred embodiments of the invention, it is to be understood that the invention is not limited solely to those precise embodiments and that various changes and modifications could be effected therein by one skilled in the art without departing from the spirit or scope of the invention as defined in the appended claims.

What we claim is:

1. A disc apparatus for performing a seek operation to a target position on one of different disc shaped recording media which may exhibit different linear velocities or circumferential recording densities, one from another, said disc apparatus comprising:

rotating means for rotating said disc-shaped recording medium;

servo means for controlling the rotating means to rotationally drive said disc shaped recording medium at a predetermined constant linear velocity;

head means for reproducing data recorded on a recording track formed on said disc-shaped recording medium;

moving means for moving said head means radially in relation to said disc-shaped recording medium;

rotation detection means for detecting a rotation speed of said disc-shaped recording medium;

position detection means for detecting a current position of said head means;

velocity calculating means for calculating a linear velocity of said disc-shaped recording medium as a function of said rotation speed and said current position;

address means for determining a target address corresponding to said target position; and generating means for generating a number of tracks to said target position on said disc-shaped recording medium from said current position as a function of said current position, said target address and said calculated linear velocity.

2. The disc apparatus according to claim 1, wherein each of said current position and said target position on said disc-shaped recording medium is represented by a cluster and sector address designated with respect to a reference position.

3. The disc apparatus according to claim 2, wherein each cluster and sector address of said disc-shaped recording medium is recorded on said recording tracks by wobbling.

4. The disc apparatus according to claim 3, further comprising means for reproducing said cluster and sector addresses from the disc-shaped recording medium to represent said current position.

5. The disc apparatus according to claim 1, wherein position addresses are recorded on said disc-shaped recording medium and said position detection means detects an address of said current position from the data reproduced by said head means.

6. The disc apparatus according to claim 5, wherein said velocity calculating means calculates said linear velocity of said disc-shaped recording medium as a function of said address of said current position.

7. The disc apparatus according to claim 1, wherein said moving means includes a stepping motor, and said position detection means is operable to detect said current position as a function of a number of steps of said stepping motor.

8. The disc apparatus according to claim 1, further comprising frequency generating means coupled to said rotating means for generating a frequency signal; and wherein said rotation detection means detects said rotation speed by monitoring said frequency signal.

9. The disc apparatus according to claim 1, wherein said generating means includes a plurality of conversion tables, each being associated with a respective linear velocity and each storing data representing the number of tracks to different target positions from a reference position; and said generating means is operable to select a particular conversion table as a function of the calculated linear velocity.

10. The disc apparatus according to claim 9, wherein said current position is represented by a cluster and sector address assigned on said disc-shaped recording medium with respect to said reference position.

11. The disc apparatus according to claim 10, further comprising frequency generator means for generating a frequency signal representing the rotation speed at which said disc-shaped recording medium is driven; rough servo means for controlling said rotating means in response to said frequency signal, and means for switching rotation servo control of said rotating means from said servo means to said rough servo means when said moving means starts to move said head means from said current position to said target position.

12. A disc apparatus for moving a head means to different positions on a disc-shaped recording medium, wherein said recording medium may exhibit a different linear velocity or circumferential recording density than another of the same type of recording media, the disc apparatus comprising:

rotating means for rotating said disc-shaped recording medium;

servo means for controlling the rotating means to rotationally drive said disc-shaped recording medium at a predetermined constant linear velocity;

head means for reproducing data recorded on a recording track formed on said disc-shaped recording medium;

moving means for moving said head means radially in relation to said disc-shaped recording medium;

rotation detection means for detecting a rotation speed of said disc-shaped recording medium;

position detection means for detecting a current position of said head means;

velocity calculating means for calculating a linear velocity of said disc-shaped recording medium as a function of said rotation speed and said current position;

address means for determining an address corresponding to a selected position; and generating means for generating a number of tracks from a reference position to said selected position as a function of said reference position, said address and said calculated linear velocity.

13. The disc apparatus according to claim 12, wherein said selected position is said current position.

14. The disc apparatus according to claim 12, wherein said selected position is a target position.

15. The disc apparatus according to claim 12, further comprising frequency generator means for generating a frequency signal representing the rotation speed at which said disc-shaped recording medium is driven; rough servo means for controlling said rotating means in response to said frequency signal, and means for switching rotation servo control of said rotating means from said servo means to said rough servo means when said moving means starts moving said head means said number of tracks.

* * * * *